Patented May 18, 1937

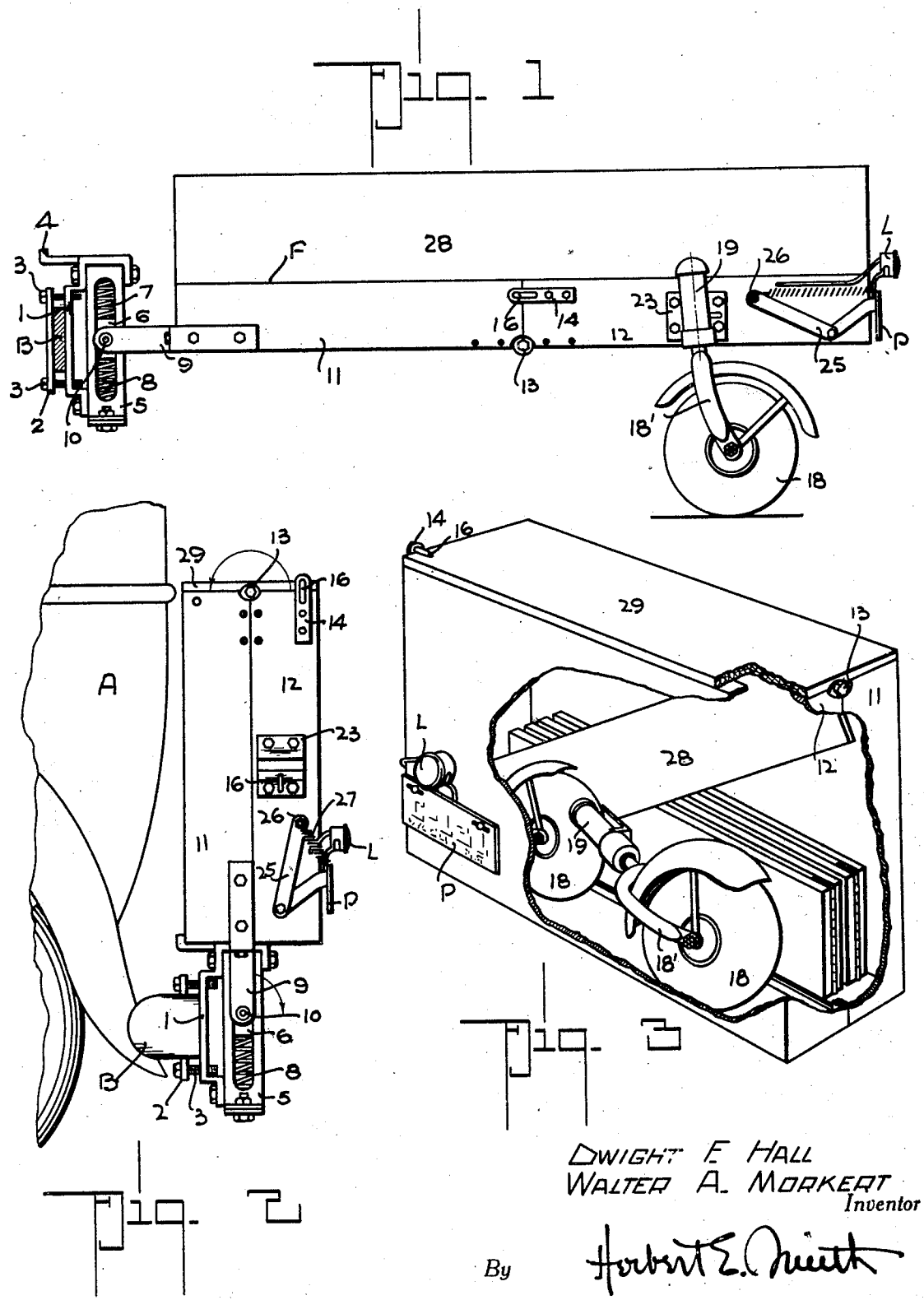

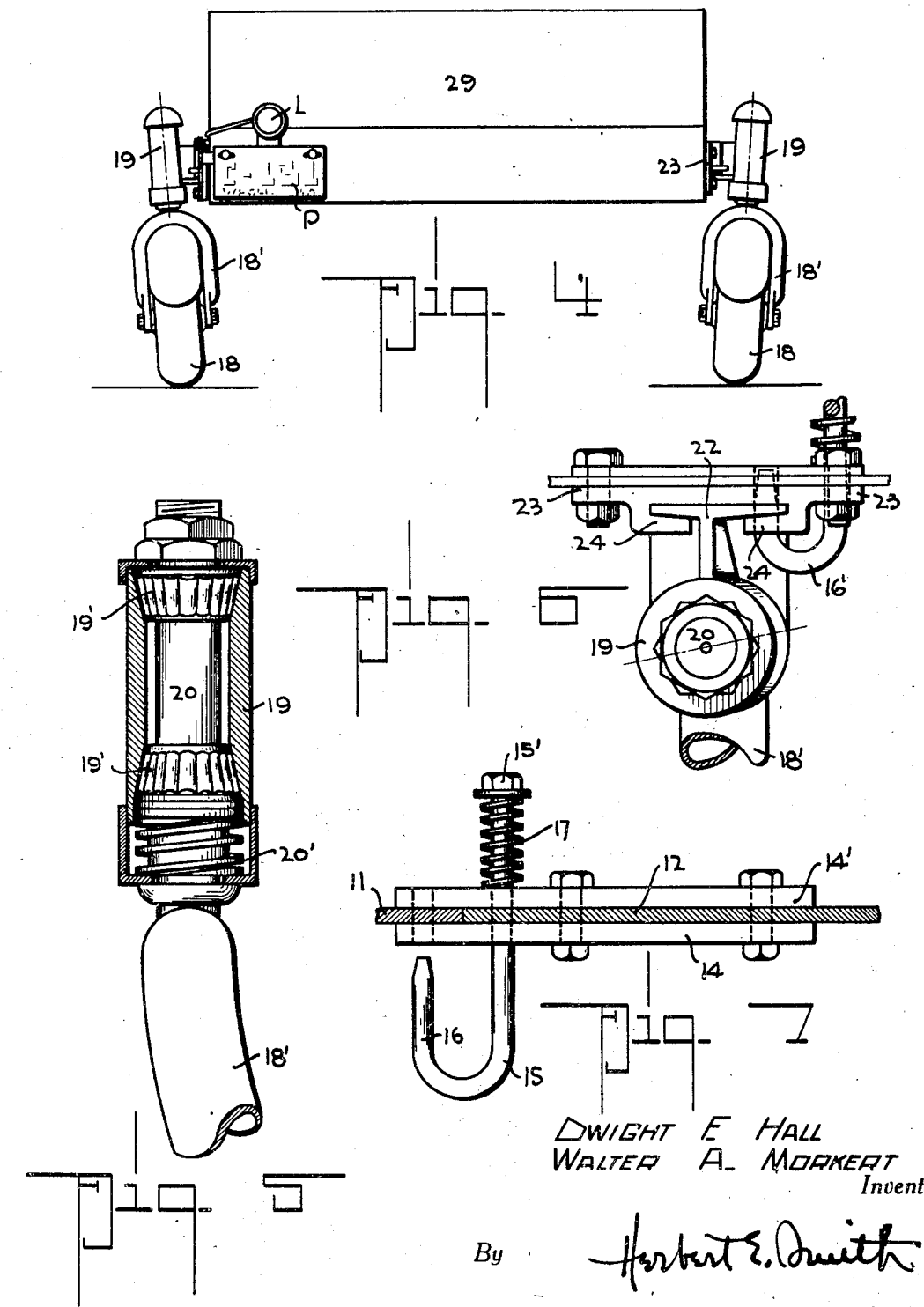

2,080,709

UNITED STATES PATENT OFFICE 2,080,709

TRAILER FOR AUTOMOBILES

Dwight F. Hall and Walter A. Morkert, Polson, Mont.

Application August 16, 1935, Serial No. 36,527

3 Claims. (Cl. 280—33.4)

Our present invention relates to improvements in trailers for automobiles and the invention in its broader aspect contemplates an attachment for automotive vehicles, which attachment is adapted to be hinged to the automobile, and which also involves a foldable body portion, which body when folded is mounted on and carried at the rear of the vehicle similar to a trunk.

The trailer, it will be understood, may be manufactured as part of the vehicle to which it is attached, as for instance, a passenger automobile may have the trailer built thereon for use in carrying baggage when desired, or for the purpose of converting the automobile into a merchandise-delivery vehicle. When employed as an attachement for an automobile as herein illustrated, the convertible trailer is mounted on the rear bumper, or detachably connected with some other suitable part of the automobile.

The trailer is equipped with a pair of swiveled, detachably-mounted supporting wheels, resiliently mounted draft connections, adjustable mount for the tail lamp and license-plate holder, and other features required to provide a complete appliance of this character that may readily be manipulated for changes to suit different conditions in use. When folded and stored in inoperative position the trailer presents the appearance of a rear-trunk mounted on the automobile, and when unfolded and set for use the trailer provides a practicable and appropriate luggage carrier of substantial capacity, or a carrier having a substantial capacity for stowing merchandise.

Our invention consists in certain novel combinations and arrangements of parts as will hereinafter be more fully set forth and claimed. In the accompanying drawings we have illustrated one complete example of the physical embodiment of our invention in which the parts are combined and arranged according to one mode we have thus far devised for the practical application of the principles of our invention. It will be understood, however, that changes and alterations may be made, and are contemplated, in the exemplifying structures, within the scope of our appended claims, without departing from the principles of the invention.

Figure 1 is a view in side elevation showing the trailer in use, and illustrating, in section, the rear bumper of a vehicle to which the trailer is attached.

Figure 2 is a side view of the folded, inoperative, trailer mounted on the rear fender or bumper of the automobile.

Figure 3 is a perspective view of the folded parts of the trailer, broken away to disclose parts that are stored within the folded structure, or trunk.

Figure 4 is a view at the rear of the trailer showing the mounts for the two wheels.

Figure 5 is an enlarged detail sectional view of the swivel arrangement for the wheels, and Figure 6 is a top plan view showing the detachable mount for the wheels and the locking latch for the wheel-mount.

Figure 7 is a horizontal sectional view showing adjoining foldable parts of the body structure of the trailer, and the U-shaped spring latch or bolt for locking them together.

In order that we may illustrate the trailer as an attachement, we have shown in Figure 2 in side elevation, a portion at the rear end of an automobile A, with the rear bumper B extending across and at the rear of the vehicle, and properly supported thereon. While the attaching means may be affixed to any suitable part of the vehicle, we have shown in Figure 1 the rear bumper B in section, to which two brackets are attached, one at or near each end of the bumper at opposite sides of the automobile. A bracket is indicated as 1 having a bracket plate 2, and by means of bolts 3 these parts are rigidly mounted on the bumper B to form a part of the coupling of the trailer, and each of these brackets is provided with an upper horizontal arm 4 fashioned with a stop lug. These two spaced bracket devices are designed for use as part of the draft-coupling when the trailer is in use as in Figure 1, and for alternate use in supporting the folded trailer as a trunk, or carrier when the trailer is not in use, as in Figure 2.

The portion of the draft-coupling mounted in the brackets comprises an upright rectangular slotted housing 5, rigidly mounted in the bracket device, and in which housing a vertically movable journal block 6 is adapted to move up and down, and above and below this block are springs 7 and 8 respectively interposed between the block and the top and bottom of the housing.

A forwardly extending draw bar 9 of suitable length is fixed at the front corner on each side of the body of the trailer, and these draw bars are pivoted or hinged at 10 to the resiliently mounted journal blocks 6 in the housings. Thus it will be apparent that the trailer is permanently coupled to the attaching brackets, that are mounted on the automobile, and that the resilient mounting for the journal blocks 6 permits absorption of relative movement between the rear end of the automobile and the front end of the trailer due to irregularities in the road, thereby maintaining the trailer in its proper relation to the towing automobile.

The body of the trailer comprises two rectangular sections 11 and 12, hinged together at 13 and adapted to be unfolded from the trunk-position of Figure 2 to the carrier position of Figure 1 where the draft bars 9 are shown attached to the inner section 11 at their lower edges. The floor line of the body of the trailer indicated at F in Figure 1, it will be seen, is elevated above the bottom edge of the body of the trailer, and the side boards 28 and end board as 29 are mounted on and above the body in suitable manner.

The front section 11 and the rear section 12 are hinged so that the hinge joint 13 is at the bottom edge of the body, and directly above the hinge joint, at the top edge of the body and on each side of the trailer a locking plate 14 is bolted to the rear section 12 and projects across the dividing line between these hinged sections. As best seen in Figure 7 this locking device comprises two plates 14 and 14' at inner and outer sides of the body-section to which they are bolted, as 12, and the body-section 11, with the projecting ends of the plates 14 and 14' are provided with registering bolt holes as indicated by dotted lines in Figure 7. A transversely extending, spring-bolt 15 is mounted in registering holes in the body-section 12 and the plates and exterior of the body-section this bolt has a U-shape or hook 16 adapted to pass through the holes of the section 11 and the plates, for locking the two sections together.

At the inside of the body section 12 the bolt has mounted thereon a spring 17 interposed between the head and washer 15' and the plate 14, and this spring tends to hold the hook-end 16 in its bolt-hole to lock the sections together. In Figure 2 where the two body sections are folded together to form a trunk and the end board 29 forms the top of the trunk, these two spring U-bolts may be employed to rigidly hold the topboard 29 of the trunk in place.

The trailer is supported by means of two castor or swiveled wheels 18, one at each side of the trailer, and detachably mounted on the rear section 12, and these wheels are canted as in Figure 1 and toed-in, as in Figure 4, to insure smooth running of the trailer.

Each wheel is journaled in a yoke or fork 18', and supported from a stationary, tubular or cylindrical swivel-head 19 with bearings 19' for the enclosed spindle 20, and a spring 20' between the lower bearing and the yoke absorbs relative up and down movement between the swiveled wheel and its head 19.

At its inner side the stationary swivel-head 19 is fashioned with an integral horizontal bracket arm 21 from which rises an integral T-web or tenon 22, and this tenon fits into the mortised plate 23 that is bolted to the exterior of the body-section 12 and fashioned with opposed flanges 24 to form the mortise for the tenon. The body-section, with its mortised plates, is first elevated, and then lowered, so that the mortised plate will slip down over the tenon and rest on the bracket arm 21, and thereafter the weight on the trailer is supported by the wheels through these arms.

In Figure 6 a locking U-bolt 16', similar to the locking bolts 15—16, is illustrated for locking together the mortise-plate and the tenon-plate forming the mounts for these wheels, and these bolts 16' of course prevent relative up and down movement between the mortise-plate and the tenon-plate.

The trailer is equipped with a tail lamp L and license-plate holder P, rigidly connected, and these parts are mounted so that they may be properly seen from the trunk as in Figure 2, and from the rear end of the trailer as in Figure 1.

For this purpose we employ a toggle-link bracket 25 that is pivoted at 26 at the outer side of the body-section 12 near its rear end, and a spring 27 anchored at one end to the pivot 26 and attached at its other end to the holder P serves to hold these toggle links in their adjusted angular positions. In Figure 1 the spring holds the holder P against the rear flat face of the trailer, and in Figure 2 the spring holds the holder P against the back wall of the trunk formed by the folded body-sections.

For setting up the trailer, the trunk is swung on its hinges 10 in the direction of the arrow, and at the same time the two body sections are unfolded on their pivots 13 in the direction of the arrow, in Figure 2, and the rear lamp L is properly adjusted. The two sections are then locked together, and the trailer is mounted on its wheels as heretofore described, after which operations the trailer is ready to be towed.

When not to be used as a trailer, the wheels and their complementary mount-parts, as well as the side boards 28 may be stored away in the trunk, and as disclosed in Figure 3, space is still left in the trunk for storage of other articles of luggage.

As seen in Figure 1 the draft arms 9 disposed at the outer sides of the coupling housings 5 prevent lateral movement of the trailer with relation to the automobile, and in Figure 2, the same arms also prevent lateral shifting of the trunk on its supporting arms 4, and in addition, the upper compressed springs 7, under tension, tend to hold down the trunk on its supporting arms 4, thus preventing displacement of the trunk.

Having thus fully described our invention, what we claim as new and desire to secure by Letters Patent is:—

1. A foldable trailer for automobiles comprising a horizontally extending front-section and means for coupling said section to an automobile whereby said section may be folded to vertical position, a rear section hinged at its bottom to the rear, bottom portion of the front section and adapted to fold in a vertical plane parallel with the front section, detachable means for rigidly locking said sections in extended horizontal position, a pair of supporting wheels, and detachable means for mounting said wheels on the rear section.

2. The combination with an automotive vehicle having an attaching device and a pair of spaced, fixed, supporting arms, of a trailer comprising a body-section hinged to said device below said arms, a second body section forming a unit and having its front bottom portion hinged to the rear bottom portion of the first body section, means for holding said body sections in extended position.

3. In a foldable trailer, the combination with an automotive vehicle having an attaching device mounted thereon and a pair of fixed, horizontal supporting arms above the device, of a horizontally extending body section forming a unit and means for supporting said section in horizontal position, a pair of spaced draw bars fixed at the front of the section and hinged to said device, said section being adapted to be swung to upright position on the supporting arms, and means co-acting with the draw bars and said attaching device for retaining said section on the supporting arms.

DWIGHT F. HALL.
WALTER A. MORKERT.